(12) United States Patent
Gonzalez et al.

(10) Patent No.: US 7,751,392 B1
(45) Date of Patent: Jul. 6, 2010

(54) CUSTOMER LINK DIVERSITY MONITORING

(75) Inventors: Jose Gonzalez, Maitland, FL (US); David Ham, Ashburn, VA (US); Shane Lobo, Orlando, FL (US); Steve Parrott, Clifton, VA (US); Jonathan Rubin, Arlington, VA (US); Drew Shinholster, Maitland, FL (US); Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 471 days.

(21) Appl. No.: 11/620,140

(22) Filed: Jan. 5, 2007

(51) Int. Cl.
*H04L 12/56* (2006.01)

(52) U.S. Cl. ..................................... 370/389

(58) Field of Classification Search .................. None
See application file for complete search history.

(56) References Cited

U.S. PATENT DOCUMENTS

| | | | |
|---|---|---|---|
| 6,570,867 B1 | 5/2003 | Robinson et al. | |
| 6,792,273 B1* | 9/2004 | Tellinger et al. | 455/442 |
| 6,813,634 B1 | 11/2004 | Ahmed | |
| 6,973,042 B1 | 12/2005 | Fitzgerald | |
| 6,978,223 B2 | 12/2005 | Milliken | |
| 7,099,912 B2 | 8/2006 | Ishizaki et al. | |
| 7,110,362 B2 | 9/2006 | Kato | |
| 7,143,152 B1 | 11/2006 | Elman | |
| 7,376,719 B1* | 5/2008 | Shafer et al. | 709/220 |
| 7,376,864 B1 | 5/2008 | Hu et al. | |
| 7,424,526 B1 | 9/2008 | Hansen et al. | |
| 7,467,225 B2 | 12/2008 | Anerousis et al. | |
| 2002/0078232 A1 | 6/2002 | Simpson et al. | |
| 2002/0087393 A1 | 7/2002 | Philonenko | |
| 2002/0103921 A1 | 8/2002 | Nair et al. | |
| 2002/0164007 A1* | 11/2002 | Henits | 379/207.02 |
| 2002/0181047 A1* | 12/2002 | Lauder et al. | 359/125 |
| 2004/0064581 A1 | 4/2004 | Shitama et al. | |
| 2004/0071164 A1 | 4/2004 | Baum | |
| 2005/0240835 A1 | 10/2005 | Dragnea et al. | |
| 2006/0215577 A1 | 9/2006 | Guichard et al. | |
| 2006/0268740 A1 | 11/2006 | Rosenberg et al. | |
| 2007/0250625 A1 | 10/2007 | Titus | |
| 2007/0274285 A1* | 11/2007 | Werber et al. | 370/351 |

OTHER PUBLICATIONS

Gonzalez, Jose, et al., "Integrated Network and Customer Database", U.S. Appl. No. 11/551,704, filed Oct. 21, 2006, 30 pages.

(Continued)

*Primary Examiner*—Chirag G Shah
*Assistant Examiner*—Yong Zhou

(57) ABSTRACT

A system having a data retriever and a database manager is provided. The data retriever retrieves router configurations from data stores for routers. The database manager parses the router configurations to determine port data for each port on each router, and integrates the port data with customer data to create an integrated database. The database manager also determines a customer link diversity based on the integrated database and displays the customer link diversity. The database manager can recommend reassignment of a customer link when the customer link diversity is less than a corresponding target customer link diversity. The database manager can also determine the customer link diversity when adding a card and determine the customer link diversity when adding a customer link.

20 Claims, 5 Drawing Sheets

OTHER PUBLICATIONS

Hame, David M., et al., "Flexible Grouping for Port Analysis", U.S. Appl. No. 12/036,289, filed Feb. 24, 2008.

Gonzalez, Jose, et al., "Network Access and Quality of Service Troubleshooting", U.S. Appl. No. 11/838,175, filed Aug. 13, 2007.

Final Office Action dated Aug. 13, 2009, U.S. Appl. No. 11/551,704, filed Oct. 21, 2006, 22 pages.

Office Action (Advisory Action) dated Oct. 16, 2009, U.S. Appl. No. 11/551,704, filed Oct. 21, 2006, 3 pages.

Office Action dated Mar. 2, 2009, U.S. Appl. No. 11/551,704, filed Oct. 21, 2006, 16 pages.

Office Action dated Apr. 3, 2009, U.S. Appl. No. 11/838,175, filed Aug. 13, 2007, 14 pages.

Office Action dated Dec. 31, 2009, U.S. Appl. No. 11/551,704, filed Oct. 21, 2006, 30 pages.

Final Office Action dated Nov. 24, 2009, U.S. Appl. No. 11/838,175, filed Aug. 13, 2007, 14 pages.

* cited by examiner

CUSTOMER LINK DIVERSITY MONITORING

CROSS-REFERENCE TO RELATED APPLICATIONS

This application includes subject matter related to the following application, which is hereby incorporated by reference: U.S. patent application Ser. No. 11/551,704, filed Oct. 21, 2006, entitled "Integrated Network and Customer Database," by Jose Gonzalez, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When a customer requests connection to a network, a network connectivity service provider can assign network devices to the customer on the basis of network diversity. Network diversity is based on the concept of reducing the number of common network connections to any network device. For example, if a large number of network connections in a geographic region are to a single router, the failure of only one router can cause a large number of connections to fail for that region. However, after connecting the customer to the network, a network connectivity service provider cannot monitor the network to determine if a technician has decreased network diversity by reassigning a link from one router to another router. Additionally, the network connectivity service provider cannot access the network to determine how network diversity can be increased due to the addition of more routers to the network.

SUMMARY

Some method embodiments provide customer link diversity monitoring by parsing router configurations to determine port data for each port on each router. The port data is integrated with customer data to create an integrated database. A customer link diversity is determined based on the integrated database. The customer link diversity is displayed.

In some system embodiments, a system having a data retriever and a database manager is provided. The data retriever retrieves router configurations from data stores for routers. The database manager parses the router configurations to determine port data for each port on each router, and integrates the port data with customer data to create an integrated database. The database manager also determines a customer link diversity based on the integrated database and displays the customer link diversity.

In some method embodiments, an integrated database is accessed. A customer link diversity is determined based on the integrated database. Reassignment of a customer link is recommended when the customer link diversity is less than a corresponding target customer link diversity.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

A customer link diversity monitoring system is provided to reduce the likelihood that the failure of one network device will cause a large number of customer connections to fail. A customer link is the collection of all the circuits and ports that are required to terminate on the same router and card in order to provide service to a customer. For many instances, a customer link is a single circuit and a single port. However, some network services offer a bundle of two or more smaller circuits to create a larger virtual circuit. These bundles can be two or more ports. All of the ports providing a bundled service are terminated on the same card. The customer link diversity monitoring system determines which ports provide a bundled service and treats those ports accordingly. The monitoring system allocates every port into customer links and determines the customer link diversity.

Customer link diversity measures the distribution of network links, or connections, from network devices to a customer. For example, customer link diversity can indicate if a large percentage of connections for a customer are to any specific router, such that the failure of only one router can cause a large number of connections to fail for the customer. The system retrieves router configurations to create an integrated database. The system accesses information in router configurations instead of directly accessing routers, thus eliminating the possibility of interfering with router operation. The system calculates customer link diversity based on the integrated database and displays the customer link diversity. Each customer can specify a target level of customer link diversity, and the system can recommend reassignment of a customer link to increase customer link diversity when any customer link diversity is less than its corresponding target customer link diversity. Each time that a card is added or a customer link is added, the system can recalculate any customer link diversity, which facilitates the continual maintenance of each customer link diversity above its corresponding target customer link diversity. Maintaining each customer link diversity above its target results in greater network reliability for customers and increased market shares for the network service provider that monitors customer link diversity.

Figure 1:
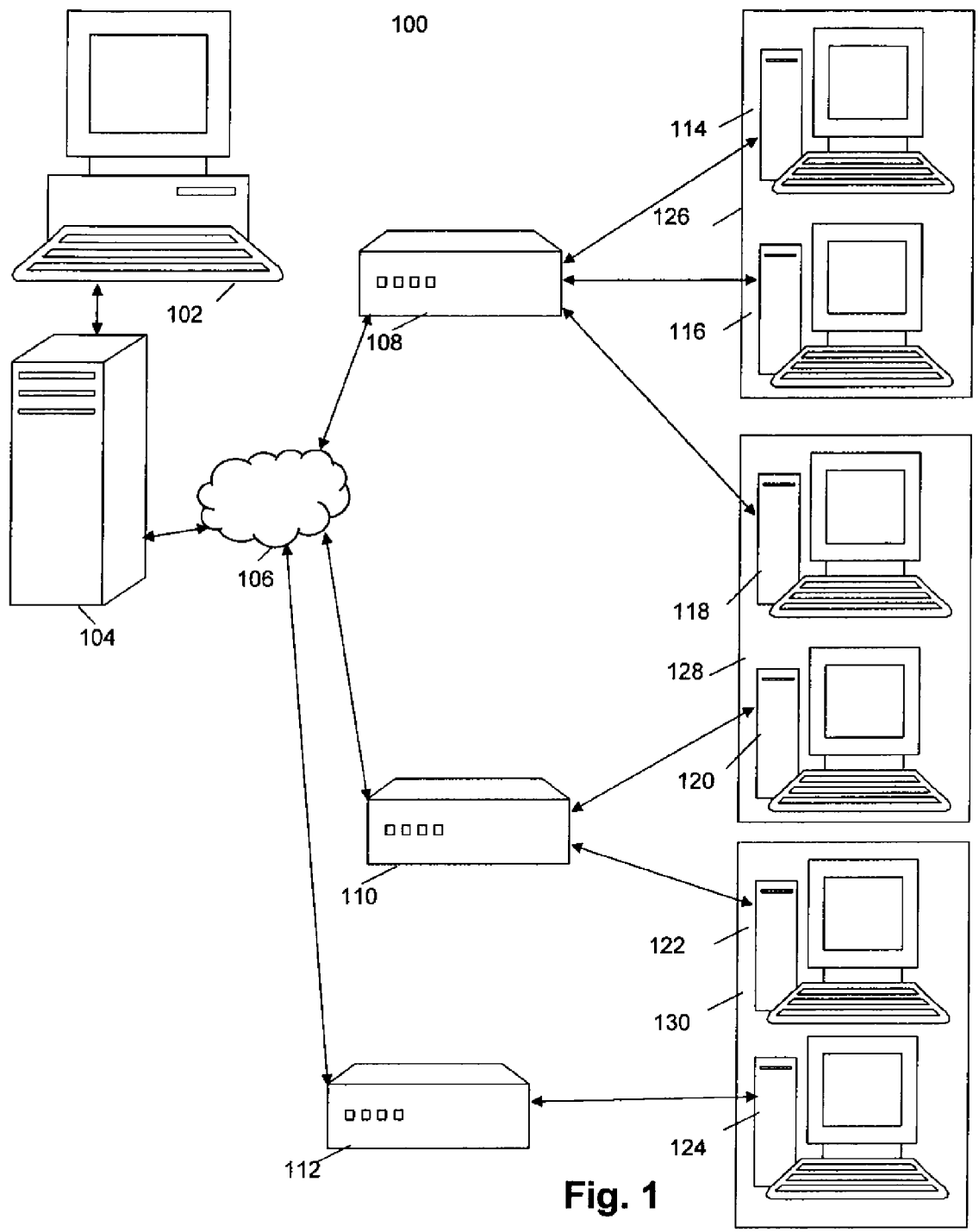
FIG. 1 shows an illustrative integrated customer link diversity monitoring system.

Turning now to FIG. 1, an illustrative customer link diversity monitoring system 100 is depicted. The numbers of each type of component in the system 100 are depicted in FIG. 1 for the purpose of an illustrative example only, as the system 100 can include any number of each component type. The system 100 includes a user interface 102 and a database server 104. The user interface 102 enables a user to interface with an integrated network and customer database on the database server 104. The user can input customer data into the integrated database through the user interface 102 to the database server 104.

The database server 104 also stores data retrieved by a data retriever accessing a network 106. The data retriever retrieves network data from network devices, such as a first router 108, a second router 110, and a third router 112 that communicate with the network 106. The network data can include data that identifies which routers, cards, and ports are connected to which customers at which locations. One network can include thousands of routers 108-112 for routing messages between computers. The routers 108-112 are depicted in FIG. 1 as external to the network 106 for illustration purposes, but can be components within the network 106. Each router forwards data packets across the network 106 toward their destinations. For example, the first router 108 sends and receives data packets for an invoicing computer 114, a collections computer 116, and a retail analysis computer 118, the second router 110 sends and receives data packets for a treasury computer 120 and a cell track computer 122, and the third router 112 sends and receives data packets for a service computer 124. The invoicing computer 114 and the collections computer 116 are located at a billing center 126, the retail analysis computer 118 and the treasury computer 120 are located at a sales center 128, and both the cell track computer 122 and the service computer 124 are located at a customer care center 130. The database server 104 stores the network data with customer data to create an integrated database. The network data can include data for multiple networks, with each network including any number of routers and data for each of the routers. The network data can be compiled from router configuration data that is stored off-line in a data store as a recovery file to enable a router to recover after power outages or router maintenance.

Figure 2A:
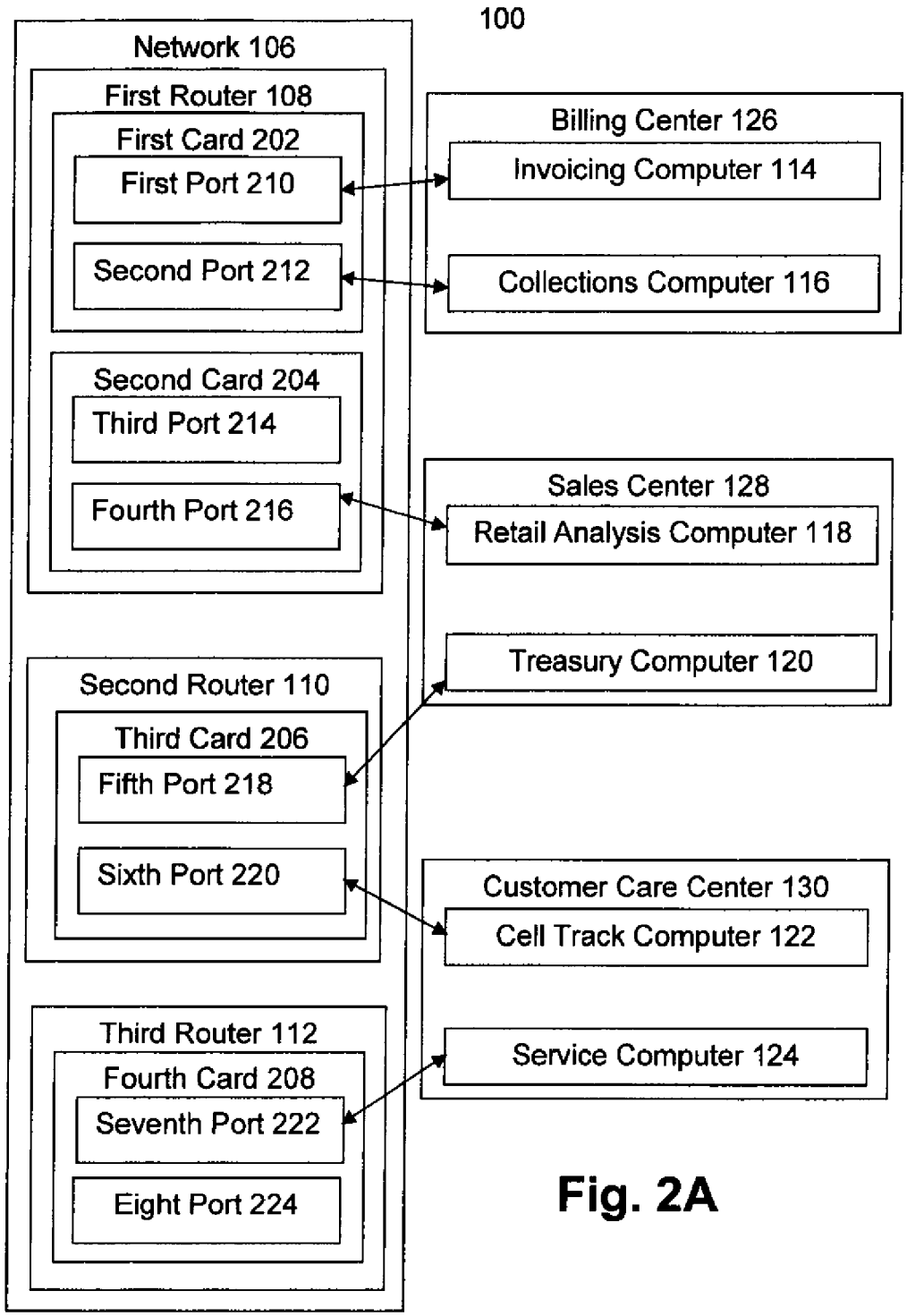
FIG. 2A shows a block diagram of an illustrative customer link diversity monitoring system.

Turning now to FIG. 2A, a block diagram of the illustrative customer link diversity monitoring system 100 is depicted. The numbers of each type of each component in the system 100 are depicted in FIG. 2A for the purpose of an illustrative example only, as the system 100 can include any number of each component type. The network 106 includes the first router 108, which includes a first card 202 and a second card 204, the second router 110, which includes a third card 206, and the third router 112, which includes a fourth card 208. Each card can include multiple ports that each link with a customer computer. For example, the first card 202 includes a first port 210 and a second port 212, the second card 204 includes a third port 214 and a fourth port 216, the third card 206 includes a fifth port 218 and a sixth port 220, and the fourth card 208 includes a seventh port 222 and an eight port 224. One customer can have multiple customer computers that link to the network 106 through the routers 108-112. The billing center 126 for the customer includes the invoicing computer 114 linked to the first port 210 on the first card 202 on the first router 108 and the collections computer 116 linked to the second port 212 on the first card 202 on the first router 108. Additionally, the sales center 128 for the customer includes the retail analysis computer 118 linked to the fourth port 216 on the second card 204 on the first router 108 and the treasury computer 120 linked to the fifth port 218 on the third card 206 on the second router 110. Furthermore, the customer care center 130 for the customer includes the cell track computer 122 linked to the sixth port 220 on the third card 206 on the second router 110 and the service computer 124 linked to the seventh port 222 on the fourth card 208 on the third router 112.

Figure 2B:
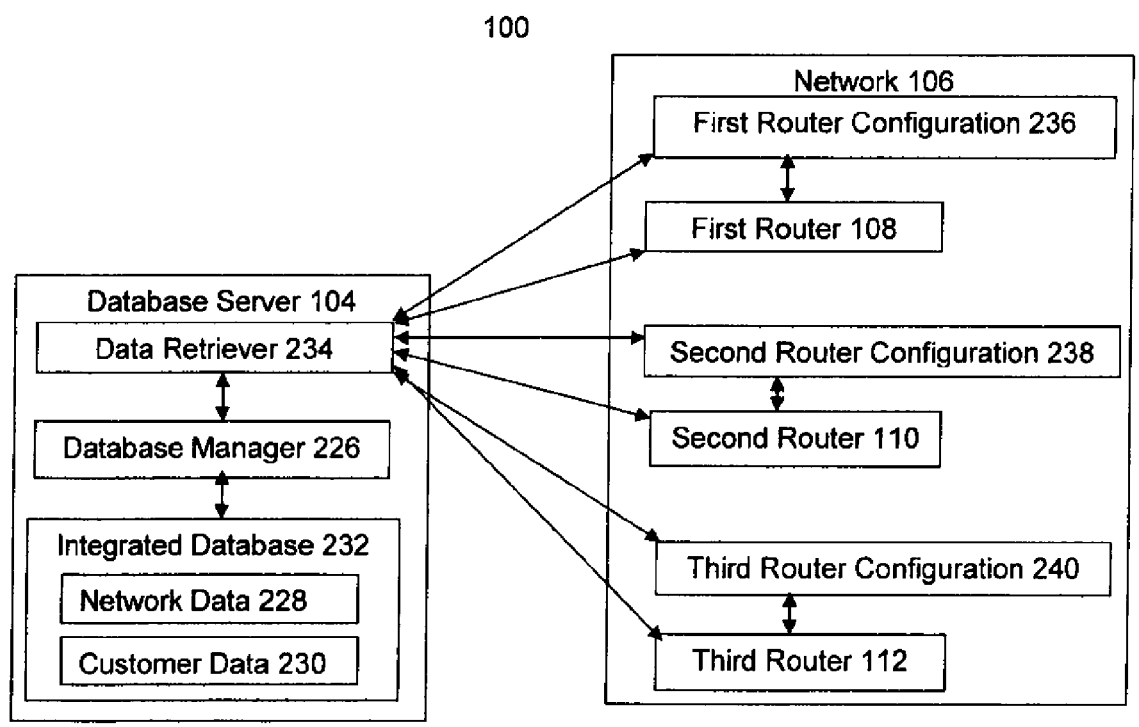
FIG. 2B shows another block diagram of an illustrative customer link diversity monitoring system according to some embodiments of the present disclosure.

Turning now to FIG. 2B, another block diagram of the illustrative customer link diversity monitoring system 100 is depicted according to some embodiments of the present disclosure. The numbers of each type of each component in the system 100 are depicted in FIG. 2B for the purpose of an illustrative example only, as the system 100 can include any number of each component type. The database server 104 can include a database manager 226 that integrates network data 228 with customer data 230 to create an integrated database 232. The network data 228 includes the port data for individual ports. The database manager 226 can receive input from a user through the user interface 102 and display the network data 228 and the customer data 230 from the integrated database 232 on the user interface 102. A data retriever 234 retrieves the network data 228 from the network 106 to provide to the database manager 226 to store in the integrated database 232. Although depicted as retrieving the network data 228 from only one network, the network 106, the data retriever 234 can retrieve the network data 228 from any number of networks. Likewise, the database manager 226 can integrate the network data 228 from any number of networks with the customer data 230 to create the integrated database 232.

The network 106 can store router configuration information off-line in a backup data store for each router to enable each router to reconfigure properly following the interruption of router power, such as power outages or router maintenance. The network data 228 is compiled from the router configuration information that includes which customer computer is linked to which port on which card for which router. The router configuration information for the first router 108 can be stored in a file in non-volatile memory in a first router configuration 236. The first router configuration 236 can be an off-line backup data store on board the router. Similarly, the router configuration information for the second router 110 can be stored in a file in non-volatile memory in a second router configuration 238. Likewise, the router configuration information for the third router 112 can be stored in a file in non-volatile memory in a third router configuration 240. By accessing router configuration information in the first router configuration 236, the second router configuration 238, and the third router configuration 240, the data retriever 234 has the option of not directly accessing the first router 108, the second router 110, or the third router 112. Not directly accessing routers eliminates the possibility of interfering with router operation.

Figure 3:
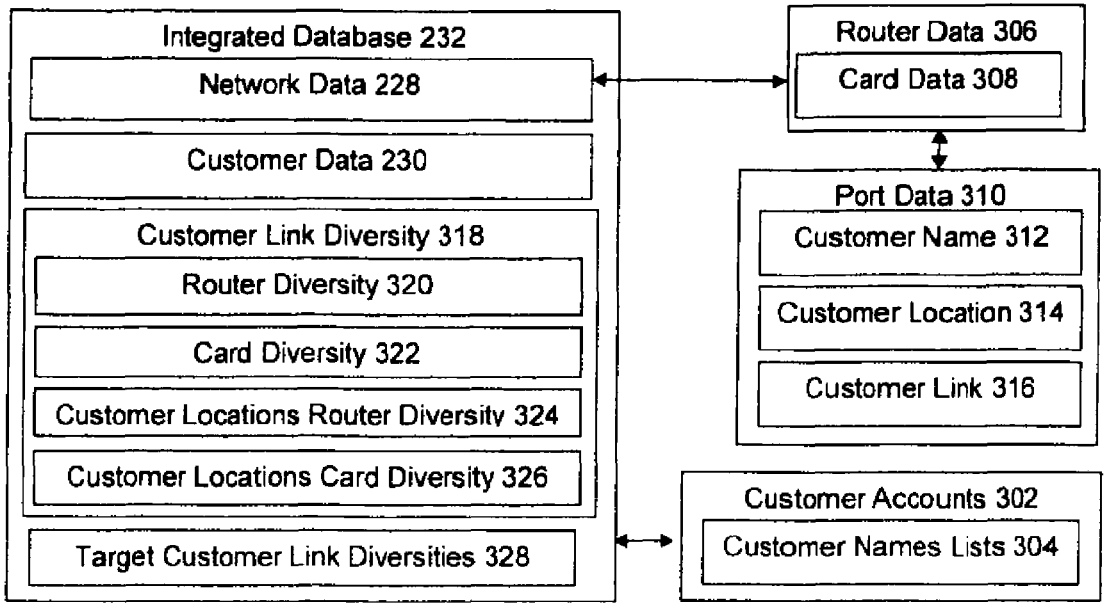
FIG. 3 shows a schema for an illustrative integrated database according to some embodiments of the present disclosure.

Turning now to FIG. 3, a schema for an illustrative integrated database 208 is depicted according to some embodiments of the present disclosure. The integrated database 232 includes the customer data 230 and the network data 228. The customer data 230 is related to customer accounts 302, a customer database that includes business information, such as billing plans, billing information, and customer names lists 304.

Each of the customer names lists 304 includes a list of each customer name used by a specific customer. For example, "Acme Corp." and "Acme Homes" are customer names used by the customer Acme Homes Corporation. In contrast, "Acme Elevators" is a customer name used by a customer that is unrelated to Acme Homes Corporation. The integrated database 232 uses the customer names lists 304 to integrate the network data 228 to the corresponding customer in the customer data 230. For example, the network data 228 for "Acme Corp." and "Acme Homes" are integrated with the customer data 230 for the customer Acme Homes Corporation, but the network data 228 for "Acme Elevator" is integrated with the customer data 230 for a different customer. The integrated database 232 can present customer names from the customer names lists 304 to a user through the user interface 102 to enable the user to select which customer names in the customer names lists 304 correspond to which customers.

The network data 228 includes router data 306, which includes network information, such as card data 308 for a specific router. The network data 228 can include data for multiple networks, with each network including any number of routers and data for each of the routers. The router data 306 can be based on router configuration data that is stored off-line in a data store as a recovery file to enable a router to recover after power outages or router maintenance.

The router data 306 includes the card data 308, and the card data 308 includes the port data 310, which can include connectivity information that specifies which specific ports located on specific cards are connected to which customer locations. The data retriever 234 retrieves the router data 306, which the database server 104 parses to determine the card data 308 and port data 310 related to the card data 308. Only one instance of the port data 310 is depicted for the purpose of an illustrative example only, as each card can include multiple ports and the card data 308 can be related to instances of the port data 310 for each port.

The port data 310 includes a customer name 312, a customer location 314, and a customer link 316. The integrated database 232 uses the customer name 312 for a specific port with the customer names lists 304 to determine to which customer the specific port corresponds. By determining which specific ports correspond to which customers, the database server 104 can respond to a selection through the user interface 102 of a specific customer listed in the customer names list 304 by displaying the port data 310 for each port that corresponds to the specific customer.

The customer location 314 can include a geographic location for a specific router, such as New York, Chicago, or Atlanta. The customer location 314 can also include the street address for a customer linked to a specific router. By relating the customer location 314 for each router to a customer, the integrated database 232 can display the router data 306 for each router related to the customer that is at a general or specific location selected through the user interface 102. For example, if a user selects Atlanta as a general location and Acme Homes Corporation as a customer, the integrated database 232 displays the router data 306 for each of Acme Home Corporation's routers that are located in Atlanta. Because a customer can communicate through multiple networks from the same location, the integrated database 232 can display the name of the corresponding network along with the router data 306 for each router.

The database manager 226 parses multiple instances of the router data 306 to determine a customer link diversity 318 based on the integrated database 232. Examples of the customer link diversity 318 include router diversity 320, card diversity 322, customer locations router diversity 324, and customer locations card diversity 326. The integrated database 232 can also include target customer link diversities 328, which can include a corresponding value for each of the determined customer link diversities. The target customer link diversities 328 can be assigned by a customer or by the user of the customer link diversity monitoring system 100 based on the needs of each customer.

The router diversity 320 is based on a number of customer links on each router. For example, FIG. 2A depicts that "Acme Corp." has total of six customer links connecting customer computers to routers, one customer link between the routers 108-112 and each of the invoicing computer 114, the collections computer 116, the retail analysis computer 118, the treasury computer 120, the cell track computer 122, and the service computer 124.

In this example, the invoicing computer 114, the collections computer 116, and the retail analysis computer 118 are all connected by customer links to the first router 108, resulting in a total of three customer links to the first router 108. Only one of the three customer links connected to the first router 108 is determined to be diverse because ideally each of these three customer links should be connected to a different router, not the same router, which results in a determined diversity of one customer link for the first router 108. Continuing this example, the treasury computer 120 and the cell track computer 122 are both connected by customer links to the second router 110, resulting in a total of two customer links to the second router 110. Only one of the two customer links connected to the second router 110 is determined to be diverse because ideally both of these two customer links should be connected to a different router, not the same router, which results in a determined diversity of one customer link for the second router 110. Further to this example, the service computer 124 is connected by a customer link to the third router 112, resulting in a total of one customer link to the third router 112. The only customer link connected to the second router 110 is determined to be diverse because the only customer link is connected to one router, which results in a determined diversity of one customer link for the third router 112.

The router diversity 320 equals the total number of customer links determined to be diverse for the routers divided by the total number of customer links for the routers. For example, one customer link is determined to be diverse for the first router 108, one customer link is determined to be diverse for the second router 110, and one customer link is determined to be diverse for the third router 112, which results in a total of three customer links determined to be diverse for the routers. Because "Acme Corp." has a total of three customer links determined to be diverse for the routers and a total of six customer links for the routers, three diverse links divided by six total links results in the router diversity 320 of 50%.

The card diversity 322 is based on a number of customer links on each card. Multiple customer links terminate on the same router for customers with a large number of customer links. Therefore, the card diversity 322 can improve through connecting customer links on different cards in the same router. For example, FIG. 2A depicts that "Acme Corp." has total of six customer links connecting customer computers to cards, one customer link between the cards 202-208 and each of the invoicing computer 114, the collections computer 116, the retail analysis computer 118, the treasury computer 120, the cell track computer 122, and the service computer 124.

In this example, the invoicing computer 114 and the collections computer 116 are connected by customer links to the first card 202, resulting in a total of two customer links to the first card 202. Only one of the two customer links connected to the first card 202 is determined to be diverse because ideally both of these customer links should be connected to a different card, not the same card, which results in a determined diversity of one customer link for the first card 202. Continuing this example, the retail analysis computer 118 is connected by a customer link to the second card 204, resulting in a total of one customer link to the second card 204. The only customer link connected to the second card 204 is determined to be diverse because the only customer link is connected to one card, which results in a determined diversity of one customer link for the second card 204.

Further to this example, the treasury computer 120 and the cell track computer 122 are both connected by customer links to the third card 206, resulting in a total of two customer links to the third card 206. Only one of the two customer links connected to the third card 206 is determined to be diverse because ideally both of these two customer links should be connected to a different card, not the same card, which results in a determined diversity of one customer link for the third card 206. Continuing this example, the service computer 124 is connected by a customer link to the fourth card 208, resulting in a total of one customer link to the fourth card 208. The only customer link connected to the fourth card 208 is determined to be diverse because the only customer link is connected to one card, which results in a determined diversity of one customer link for the fourth card 208.

The card diversity 322 equals the total number of customer links determined to be diverse for the cards divided by the total number of customer links for the cards. For example, one customer link is determined to be diverse for the first card 202, one customer link is determined to be diverse for the second card 204, one customer link is determined to be diverse for the third card 206, and one customer link is determined to be diverse for the fourth card 208, which results in a total of four customer links determined to be diverse for the cards. Because "Acme Corp." has a total of four customer links determined to be diverse for the cards and a total of six customer links for the cards, four diverse links for the cards divided by six total links for the cards results in the card diversity 320 of 66.6%.

The customer locations router diversity 324 is based on a number of customer links on each router to each specific location. By identifying the street addresses for the customer location 314, the database manager 226 can determine that a customer has more than one specific customer location in a city. A single specific customer location can have more than one customer link in an effort to improve reliability, i.e., to insure the customer location retains at least one customer link if any of the other customer location links fail. This effort may be for naught if all of the customer links for a specific customer location connect to the same router, because the failure of one router can cause the failure of multiple customer links. For example, because the billing center 126 is connected by two links to the first router 108, only one of the billing center 126 links is diverse. Because the sales center 128 is connected by two links to different routers, the first router 108 and the second router 110, both of the sales center 128 links are diverse. Because the customer care center 130 is connected by two links to different routers, the second router 110 and the third router 112, both of the customer care center 130 links are diverse.

The customer locations router diversity 324 equals the total number of customer location links determined to be diverse divided by the total number of customer location links. For example, one customer location link is determined to be diverse for the first billing center 126, two customer location links are determined to be diverse for the sales center 128, and two customer location links are determined to be diverse for the customer care center 130, which results in a total of five customer location links determined to be diverse. Because "Acme Corp." has a total of five customer location links determined to be diverse and a total of six customer location links, five diverse links divided by six total links results in the customer locations router diversity 324 of 83.3%.

The customer locations card diversity 326 is based on a number of customer links on each card to each specific location. For example, FIG. 2A depicts that "Acme Corp." has total of six customer links connecting customer computers to cards, one customer link between the cards 202-208 and each of the invoicing computer 114, the collections computer 116, the retail analysis computer 118, the treasury computer 120, the cell track computer 122, and the service computer 124.

The billing center 126 is connected by two links, each to the first card 202. Ideally both of these two customer links from the billing center 126 should be connected to a different card, but both of the customer links are connected to the same card, the first card 202. Only one of the customer links connected from the billing center 126 is determined to be diverse.

Continuing this example, the sales center 128 is connected by one link to the second card 204 and by one link to the third card 206. Both of the customer links connected from the sales center 128 are determined to be diverse.

Further to this example, the customer care center 130 is connected by one link to the third card 206 and by one link to the fourth card 208. Both of the customer links connected from the customer care center 130 are determined to be diverse.

The customer locations card diversity 326 equals the total number of customer links determined to be diverse from each specific location to the cards divided by the total number of customer links. For example, one customer link is determined to be diverse for the billing center 126 to the first card 202, two customer links are determined to be diverse for the sales center 128 to the cards 204-206, and two customer links are determined to be diverse for the customer care center 130 to the cards 206-208, which results in a total of five customer links determined to be diverse from each specific location to the cards. Because "Acme Corp." has a total of five customer links determined to be diverse from each specific location to the cards and a total of six customer links, five diverse links divided by six total links results in the customer locations card diversity 324 of 83.3%.

The target customer link diversities 328 is a set of threshold customer link diversities that correspond to each of the customer link diversities that can be determined. For example, the integrated database 232 can include individual target customer link diversities 328 that correspond to each of the router diversity 320, the card diversity 322, the customer locations router diversity 324, and the customer locations card diversity 326 for "Acme Corp." Continuing this example, "Acme Corp." can specify a target customer link diversity of 50% for the router diversity 320, a target customer link diversity of 50% for the card diversity 322, a target customer link diversity of 90% for the customer locations card diversity 326, and no target customer link diversity for the customer locations router diversity 324. Each customer can specify their own target customer link diversities 328 based on requirements for the customer. The higher that a customer sets their own target customer link diversities 328, the more changes may need to be made to meet the high target customer link diversities 328, changes that may generate additional expenses for the customer. Each customer can decide how important each type of customer link diversity 318 is for the customer and how much the customer may be willing to pay for maintaining the customer link diversity 318, and then set their own target customer link diversities 328 accordingly. Alternatively, a network service provider may evaluate each type of customer link diversity 318 for a customer and reassign customer links as new network devices are added to the network. The target customer link diversities 328 can be entered into the integrated database for each customer by the customer or by the user of the customer link diversity monitoring system 100.

Figure 4:
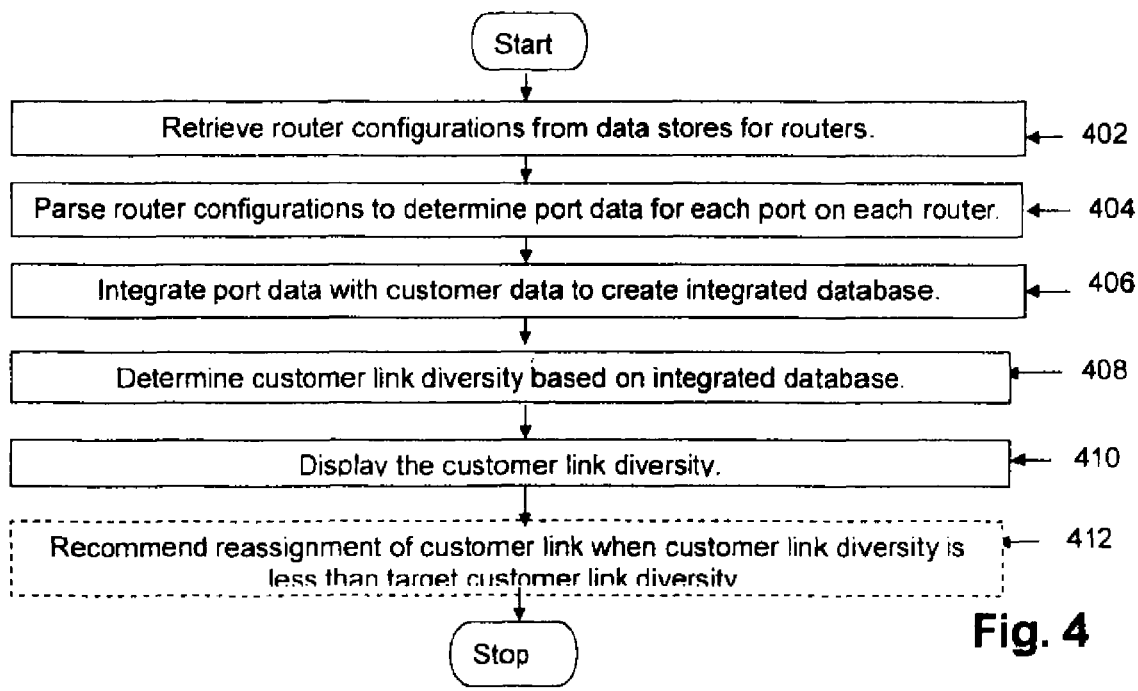
FIG. 4 shows an illustrative customer link diversity monitoring method according to some embodiments of the present disclosure.

Turning now to FIG. 4, an illustrative integration method for customer link diversity monitoring is depicted according to some embodiments of the present disclosure. Executing the integration method results in determining the customer link diversity 318 based on the integrated database 232.

In box 402, the data retriever 234 retrieves router configurations from data stores for routers. The data retriever 234 can retrieve the router configurations from off-line backup data stores for the routers so that the on-line routers are not directly accessed during normal operations. The on-line routers can store their router configurations in the off-line backup data stores periodically, such as each day when throughput is low.

In box 404, the database server 104 parses the router configurations to determine the port data 310 for each port on each router. The data retriever 234 can retrieve the router data 306 and the database server 104 can parse the router data 306 to determine the port data 310 for each port on each router. Alternatively, the data retriever 234 can retrieve the router data 306 and parse the router data 306 to determine the port data 310 for each port on each router. For example, parsing the router data 306 determines the port data 310 that specifies the customer name 312 for a port is "Acme Homes" and the customer link 316 is between the invoicing computer 114 at the billing center 126 and the first port 210 on the first card 202 on the first router 108. As another example, parsing the router data 306 can determine the customer location 314 that specifies Chicago as the geographic location for the router that contains the port and the customer link 316 is between the collections computer 116 at the billing center 126 and the second port 212 on the first card 202 on the first router 108.

In box 406, the database server 104 integrates the port data 310 with the customer data 230 to create the integrated database 232. The database server 104 uses the customer name 312 for each port on each router in combination with the customer names list 304 to integrate the customer data 230 with the network data 228, which includes the port data 310. For example, the port data 310 related to the network data 228 specifies that the customer name 312 for the first port 210 is "Acme Homes," and the port data 310 related to the network data 228 specifies that the customer name 312 for the second port 212 is "Acme Corp." For this example, the database server 104 integrates the port data 310 for the first port 210 and the port data 310 for the second port 212 with the customer data 230 for Acme Homes Corporation. The database server 104 stores this integrated network data 228 and customer data 230 in the integrated database 232. The integrated database 232 can include network data 228 that is current data and network data 228 that is historical data.

In box 408, the database manager 226 determines each customer link diversity 318 for each customer based on the integrated database 232. For example, based on the example discussed above for FIG. 2A, the database manager 226 determines the customer locations card diversity 326 is 83.3% for "Acme Corp."

In box 410, the database manager 226 displays each customer link diversity 318 for a customer specified through the user interface 102. A user can instruct the database manager 226 to determine a specific customer link diversity 318 for a specific customer. For example, the database manager 226 displays the customer locations card diversity 326 of 83.3% for "Acme Corp." to the user of the customer link diversity monitoring system 100.

In box 412, the database manager 226 recommends a reassignment of a customer link when the customer link diversity 318 is less than the target customer link diversity 328. For example, the customer locations card diversity 326 of 83.3% for "Acme Corp." is less than the corresponding target customer link diversity 328 of 90% for "Acme Corp." The database manager 226 may also evaluate the customer locations card diversity 326 for "Acme Corp." based on potential reassignments of a customer link for "Acme Corp."

For example, the database manager 226 evaluates the potential reassignment of the customer link for the collections computer 116 from the second port 212 on the first card 202 on the first router 108 to the third port 214 on the second card 204 on the first router 108. Continuing this example, the customer links from the billing center 126 are customer links to the first card 202 and the second card 204. Both of these customer links connected to the billing center 126 are now determined to be diverse because the customer links from the billing center 126 are each connected to a different card.

Further to this example, the potential reassignment of the customer link from the collections computer 116 from the second port 210 on the first card 202 on the first router 108 to the third port 214 on the second card 204 on the first router has no effect on the customer locations card diversity 326 for the sales center 128 or the customer care center 130.

Therefore, two customer links are determined to be diverse from the billing center 126 to the cards 202-204, two customer links are determined to be diverse for the sales center 128 to the cards 204-206, and two customer links are determined to be diverse for the customer care center 130 to the cards 206-208, which results in a total of six customer links determined to be diverse from each specific locations to the cards. Because "Acme Corp." has a total of six customer links determined to be diverse from each specific location to the cards and a total of six customer links, six diverse links divided by six total links results in the customer locations card diversity 324 of 100.0%.

The evaluation of the potential reassignment of the customer link for the collections computer 116 determines that the customer locations card diversity 326 of 83.3% for "Acme Corp." can be increased above the target customer link diversities 328 of 90% that corresponds to the customer locations card diversity 326 for "Acme Corp." Therefore, the database manager 226 recommends a reassignment of a customer link for the collections computer 116. The database manager 226 recommends that a technician unplug the link for the collections computer 116 from the second port 212 on the first card 202 on the first router 108 and plug the link for the collections computer 116 to the third port 214 on the second card 204 on the first router 108. This reassignment results in each customer link diversity 318 for "Acme Corp." exceeding the corresponding target customer link diversities 328 for "Acme Corp."

Because the customer link diversity monitoring is ongoing, as the method is repeated periodically, each customer link diversity 318 is automatically updated when the network 106 changes, e.g., when cards are added or when new links are added or removed. The database manager 226 determines the customer link diversity 318 when adding a card and determines the customer link diversity 318 when adding a customer link. A user of the customer link diversity monitoring system 100 can instruct the database manager 226 to determine each customer link diversity 318 for each customer. For example, the database manager 226 determines the card diversity 322 for each customer when adding a card to the first router 108. In another example, the database manager 226 determines the router diversity 322 for "Acme Corp." when adding a customer link for another customer computer in the billing center 126. The database manager 226 enables the customer link diversity monitoring system 100 to monitor customer link diversity 318 periodically, as customers add customer links and as network service providers add cards and routers to their networks. As the customer link diversity 318 changes for customers, the customer link diversity monitoring system 100 recommends reassignment of customer links when a changed customer link diversity 318 is below a target customer link diversity specified by a customer. The system 100 can output a recommendation for a reassignment of a customer link if the reassignment can increase the customer link diversity 318 for a customer, or output a notice that current potential reassignments would not increase the customer link diversity 318 for the customer.

Figure 5:
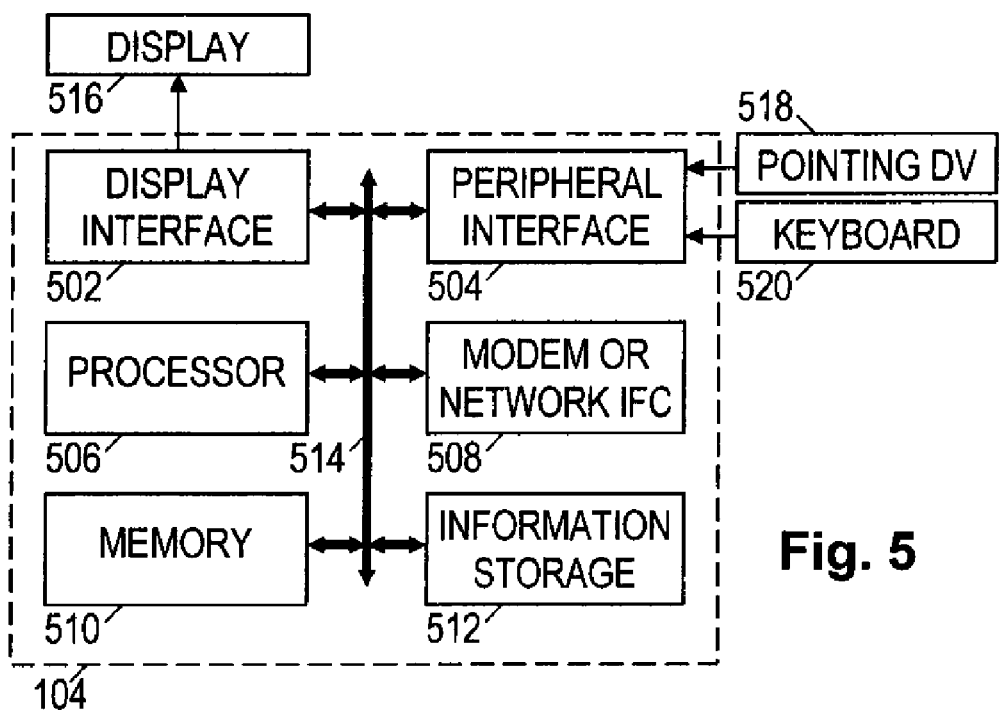
FIG. 5 shows a block diagram of an illustrative server for customer link diversity monitoring according to some embodiments of the present disclosure.

Turning now to FIG. 5, an illustrative database server 104 for customer link diversity monitoring is depicted. The database server 104 may comprise a display interface 502, a peripheral interface 504, a processor 506, a modem or other suitable network interface 508, a memory 510, an information storage device 512, and a bus 514. The database server 104 may be a bus-based computer, with the bus 514 interconnecting the other elements and carrying communications between them. The display interface 502 may take the form of a video card or other suitable display interface that accepts information from the bus 514 and transforms it into a form suitable for a display 516, such as a display for the user interface 102. Conversely, the peripheral interface 504 may accept signals from a keyboard 518, such as a keyboard for the user interface 102, and other input devices such as a pointing device 520, and transform them into a form suitable for communication on the bus 514. Such forms suitable for communication can include customer data 230 entered by a user.

The processor 506 gathers information from other system elements, including input data from the peripheral interface 504, and program instructions and other data from the memory 510, the information storage device 512, or from a remote location via the network interface 508. The processor 506 carries out the program instructions and processes the data accordingly. The program instructions may further configure the processor 506 to send data to other system elements, comprising information for the user which may be communicated via the display interface 502 and the display 516, information such as a recommendation to reassign a customer link.

The network interface 508 enables the processor 506 to communicate with remote systems via a network. The memory 510 may serve as a low-latency temporary store of information for the processor 506, and the information storage device 512 may serve as a long term (but higher latency) store of information, including information such as a recommendation to reassign a customer link.

The processor 506, and hence the database server 104 as a whole, operates in accordance with one or more programs stored on the information storage device 512. The processor 506 may copy portions of the programs into the memory 510 for faster access, and may switch between programs or carry out additional programs in response to user actuation of the input device. The additional programs may be retrieved from the information storage device 512 or may be retrieved from remote locations via the network interface 508. One or more of these programs configures the database server 104 to carry out at least one of the customer link diversity monitoring methods disclosed herein.

The database server 104 is shown as a server, although any electronic device having some amount of computing power coupled to a user interface may be configured to carry out the methods disclosed herein. Among other things, personal computers, portable computers, personal digital assistants (PDAs) and mobile phones may be configured to carry out aspects of the disclosed integrated network and customer database methods.

The display 516 for the user interface 102 is shown in FIG. 1 as a video monitor, but may take many alternative forms such as a printer, a speaker, or other means for communicating information to a user, information such as a recommendation to reassign a customer port. The input device for the user interface 102 is shown in FIG. 1 as a the keyboard 520, but may similarly take many alternative forms such as a button, a mouse, a keypad, a dial, a motion sensor, a camera, a microphone or other means for receiving information from a user, information such as customer data 230 entered by a user.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A network monitoring method, comprising:

operating a component stored on a memory and executed by a processor to parse router configurations to determine port connectivity information for each port on each router in a network, wherein the port connectivity information comprises information that specifies which ports on which cards on which routers are connected by which of a plurality of customer links of a customer to which of a plurality of customer locations of the customer;

operating a component stored on a memory and executed by a processor to integrate the port connectivity information with customer data, the customer data comprising customer account information of the customer, to create an integrated database, wherein the integrated database identifies the port connectivity information that corresponds to the customer account information of the customer;

operating a component stored on a memory and executed by a processor to determine a customer link diversity for the customer based on the integrated database, wherein the customer link diversity is calculated based on a total number of selected customer links of the customer relative to a number of the total number of selected customer links of the customer determined to be diverse links and wherein a particular customer link is considered diverse when the particular customer link comprises a particular collection of circuits and ports that is unique relative to the other customer links of the customer; and operating a component stored on a memory and executed by a processor to display the customer link diversity;

wherein each customer link is a collection of circuits and ports that are needed to terminate on a particular router and card in order to provide a service to the customer, wherein each customer link provides at least one service to the customer, and wherein each customer link terminates at a different access point of the customer to provide access to the at least one service.

2. The method of claim 1 further comprising recommending reassignment of a customer link when the customer link diversity is less than a corresponding target customer link diversity.

3. The method of claim 1 wherein the customer link diversity comprises a router diversity based on a number of customer links on each router.

4. The method of claim 1 wherein the customer link diversity comprises a card diversity based on a number of customer links on each card.

5. The method of claim 1 wherein the customer link diversity comprises a customer locations router diversity based on a number of customer links on each router to each location.

6. The method of claim 1 wherein the customer link diversity comprises a customer locations card diversity based on a number of customer links on each card to each location.

7. The method of claim 1 further comprising determining the customer link diversity when adding a card and determining the customer link diversity when adding a customer link.

8. A system having an integrated network and customer database, comprising:

a data retriever stored on a memory and executed by a processor to retrieve router configurations from data stores for routers; and a database manager stored on a memory and executed by a processor to parse the router configurations to determine port data for each port on each router, wherein the port data comprises information that specifies which ports on which cards on which routers are connected by which of a plurality of customer links of a customer to which of a plurality of customer locations of the customer, to integrate the port data with customer data of the customer to create an integrated database, wherein the integrated database identifies the port data that corresponds to the customer, to determine a customer link diversity based on the integrated database, wherein the customer link diversity is calculated based on a total number of selected customer links of the customer relative to a number of the total number of selected customer links of the customer determined to be diverse links, and to display the customer link diversity on a user interface;

wherein a particular customer link is considered diverse when the particular customer link comprises a particular collection of circuits and ports that is unique relative to the other customer links of the customer, wherein each customer link is a collection of circuits and ports that are needed to terminate on a particular router and card in order to provide a service to the customer, wherein each customer link provides at least one service to the customer, and wherein each customer link terminates at a different access point of the customer to provide access to the at least one service.

9. The system of claim 8 wherein the database manager is further operable to recommend a reassignment of a customer link when the customer link diversity is less than a corresponding target customer link diversity.

10. The system of claim 8 wherein the customer link diversity comprises a router diversity based on a number of customer links on each router or wherein the customer link diversity comprises a card diversity based on a number of customer links on each card.

11. The system of claim 8 wherein the customer link diversity comprises a customer locations router diversity based on a number of customer links on each router to each location.

12. The system of claim 8 wherein the customer link diversity comprises a customer locations card diversity based on a number of customer links on each card to each location.

13. The system of claim 8 wherein the database manager is further operable to determine the customer link diversity when adding a card and determine the customer link diversity when adding a customer link.

14. A network monitoring method, comprising:

operating a component stored on a memory and executed by a processor to determine a customer link diversity for a customer linked to a network, wherein the customer link diversity is calculated based on a total number of selected customer links of the customer relative to a number of the total number selected customer links of the customer determined to be diverse links, wherein a particular customer link is considered diverse when the particular customer link comprises a particular collection of circuits and ports that is unique relative to the other customer links of the customer;

operating a component stored on a memory and executed by a processor to compare the customer link diversity for the customer to a target customer link diversity for the customer; and operating a component stored on a memory and executed by a processor to recommend reassignment of a customer link for the customer when the customer link diversity is less than the target customer link diversity;

wherein each customer link is a collection of circuits and ports that are needed to terminate on a particular router and card in order to provide a service to the customer, wherein each customer link provides at least one service to the customer, and wherein each customer link terminates at a different access point of the customer to provide access to the at least one service.

15. The method of claim 14 wherein the customer link diversity comprises a router diversity based on a number of customer links on each router.

16. The method of claim 14 wherein the customer link diversity comprises a card diversity based on a number of customer links on each card.

17. The method of claim 14 wherein the customer link diversity comprises a customer locations router diversity based on a number of customer links on each router to each location.

18. The method of claim 14 wherein the customer link diversity comprises a customer locations card diversity based on a number of customer links on each card to each location.

19. The method of claim 14 further comprising determining the customer link diversity when adding a card and determining the customer link diversity when adding a customer link.

20. The method of claim 14, wherein the customer link diversity is calculated based on a total number of selected customer links relative to a number of the total number of selected customer links determined to be diverse links.

* * * * *